Aug. 25, 1964  S. S. BROWN  3,145,585
EPI-CYCLE GEAR TRAIN FOR FLOOR POLISHER MOTOR
Filed Oct. 18, 1962  2 Sheets-Sheet 1

INVENTOR.
STEFFEN S. BROWN
BY *Toulmin & Toulmin*
ATTORNEYS

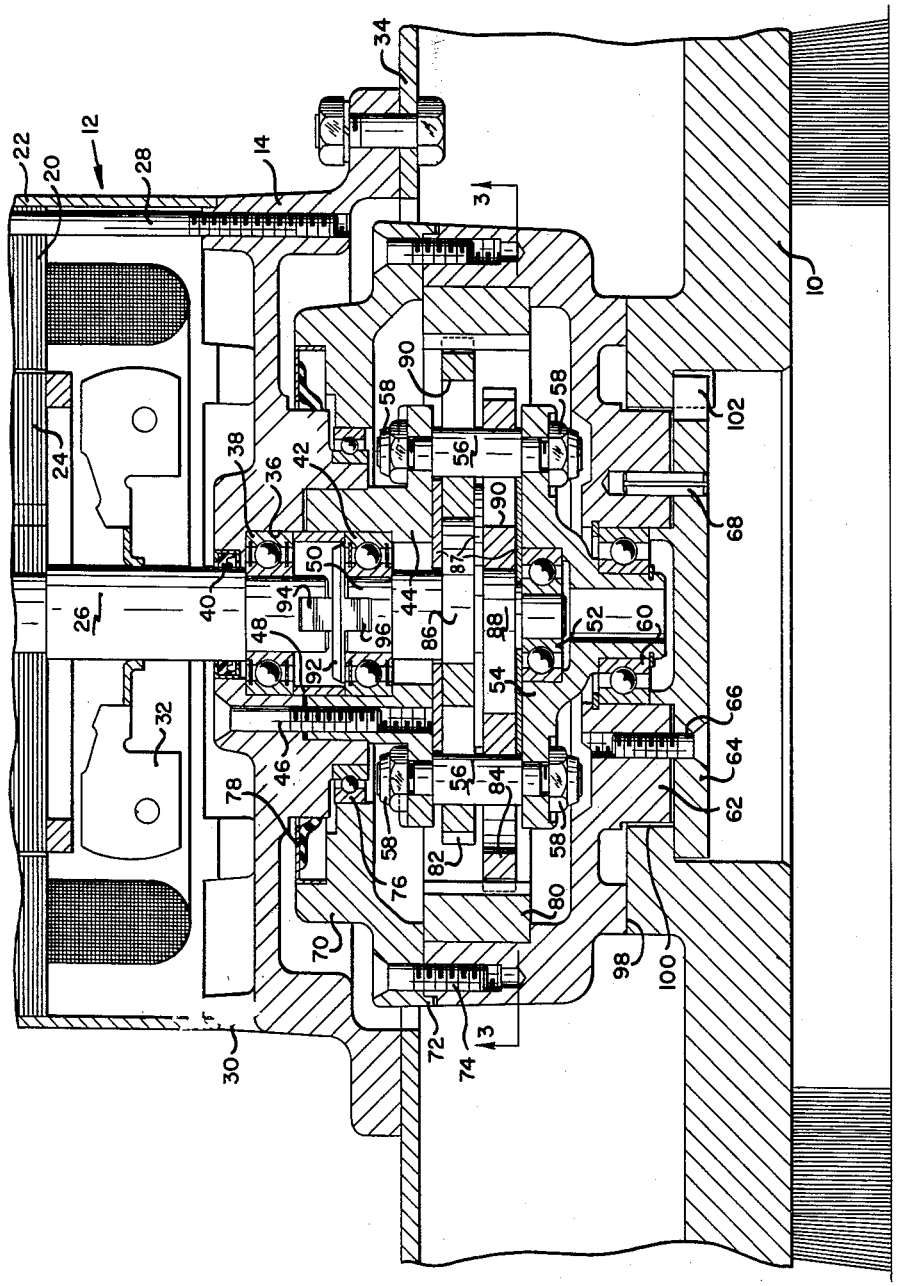

United States Patent Office 3,145,585
Patented Aug. 25, 1964

3,145,585
EPI-CYCLE GEAR TRAIN FOR FLOOR
POLISHER MOTOR
Steffen S. Brown, Dayton, Ohio, assignor to The Brown-Brockmeyer Company, Dayton, Ohio, a corporation of Ohio
Filed Oct. 18, 1962, Ser. No. 231,350
8 Claims. (Cl. 74—805)

This invention relates to speed reduction gearing and is particularly concerned with a speed reducing gearing arrangement in association with an electric drive motor.

In many instances where electric motors are employed, the speed of the output shaft of the electric motor is too high for the work to be done. Under these circumstances, speed reducing devices are employed, sometimes directly associated with the drive motor and quite often taking the form of speed reducing gearing.

In the particular arrangement with which the present invention is concerned, a floor polisher unit is provided having an electric drive motor and connected thereto by speed reducing gearing is a polishing brush or other floor working tool. It is in particular respect to the speed reducing gearing between the motor and the brush that the present invention is concerned. It will be understood in this regard that the illustrations in connection with a floor polisher arrangement are illustrative only and that the gearing as disclosed would have many regions of application other than the particular floor polisher unit illustrated.

With the foregoing in mind, a primary object of the present invention is the provision of an improved speed reducing gearing arrangement especially adapted for interconnecting an electric motor with a tool to be driven thereby.

Another object of the present invention is the provision of an extremely compact speed reducing gear arrangement for association with an electric motor so that the gearing becomes adaptable to compact units such as floor polishers and the like.

Still another object of the present invention is the provision of a speed reducing gearing arrangement, one in which the gearing is enclosed within a housing, which housing is driven by the gearing, and therefore can serve as a support for the tool to be driven.

The foregoing objects and advantages of the present invention as well as still other objects and advantages, will become more apparent on reference to the following specification taken in connection with the accompanying drawings in which:

FIGURE 2 is a vertical sectional view through the floor polisher indicated by line 2—2 on FIGURE 1 and showing the gear arrangement according to the present invention interconnecting an electric motor shaft with a driven tool.

Figure 1:
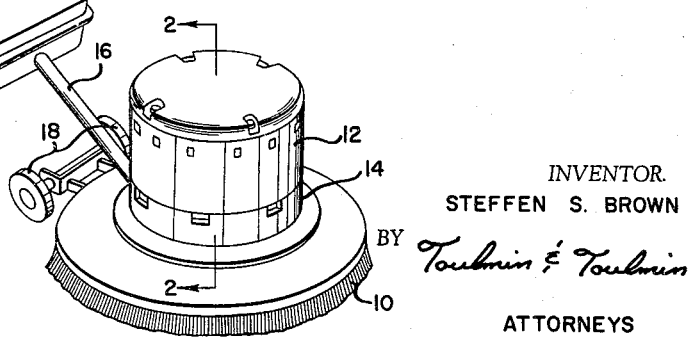
FIGURE 1 is a perspective view showing a floor polisher unit of the type adapted for use with the present invention.

Referring to the drawings, the floor polisher illustrated in FIGURE 1 comprises a brush 10 which is driven in rotation by a motor 12 that is supported by a frame member 14 relative to which brush 10 rotates. Frame member 14 has attached thereto handle means 16 for manipulation of the polisher and the polisher may also include support wheels 18 as may be desired.

Turning now to FIGURE 2, it will be seen that the motor 12 comprises a stator 20 mounted in a casing 22 and rotatable within stator 20 is rotor 24 that is fixed to output shaft 26.

The frame member 14 of the floor polisher is connected to the motor stator as by the bolts 28 and forms the lower end covering for the motor. Frame member 14 may include air inlets 30 through which air is drawn for circulation through the electric motor by a fan 32 mounted on shaft 26.

Frame member 14 may also be availed over supporting a cover member 34 that extends outwardly and surrounds the peripheral portion of the brush previously referred to.

Frame member 14 has a recess 36 therein for receiving an anti-friction bearing 38 that receives and rotatably supports the lower end of shaft 26. A seal ring 40 may be employed for sealing about shaft 26 between the bearing 38 and the inside of the motor.

An anti-friction bearing 42 in axial alignment with bearing 38 is received in a block 44 that is bolted to member 14 by bolts or screws 46. A spacer sleeve 48 between the bearings 38 and 42 holds them in fixedly spaced relation.

Bearing 42 supports the upper end of a shaft 50 that at its lower end is supported by still another anti-friction bearing 52. The bearing 52 is received in a frame member 54 corresponding generally in function to the previously mentioned frame member 44. Studs 56 extend between and interconnect frame members 44 and 54, and are fixed in place by nuts 58. As will be seen hereinafter studs 56 are preferably four or more in number and are uniformly and circumferentially spaced about the axis of rotation of shaft 50.

The frame member 54 engages the inner race of still another anti-friction bearing 60, the outer race of which is connected to housing member 62 of the gear reduction unit by plate 64 secured to the housing member by screws 66. The plate 64 is preferably doweled in place on housing member 64 as by means of one or more roll pins 68.

Housing member 62 represents the lower part of the housing of the gear reduction unit, the upper part being indicated by reference number 70. The two housing parts are in telescopic engagement as indicated at 72 and are fixed together by screws or bolts 74.

Upper housing part 70, by way of anti-friction bearing 76, is rotatably supported on the stationary frame member 14 of the floor polisher. An annular seal 78 is provided between the housing and a cylindrical surface formed on frame member 14.

Figure 3:
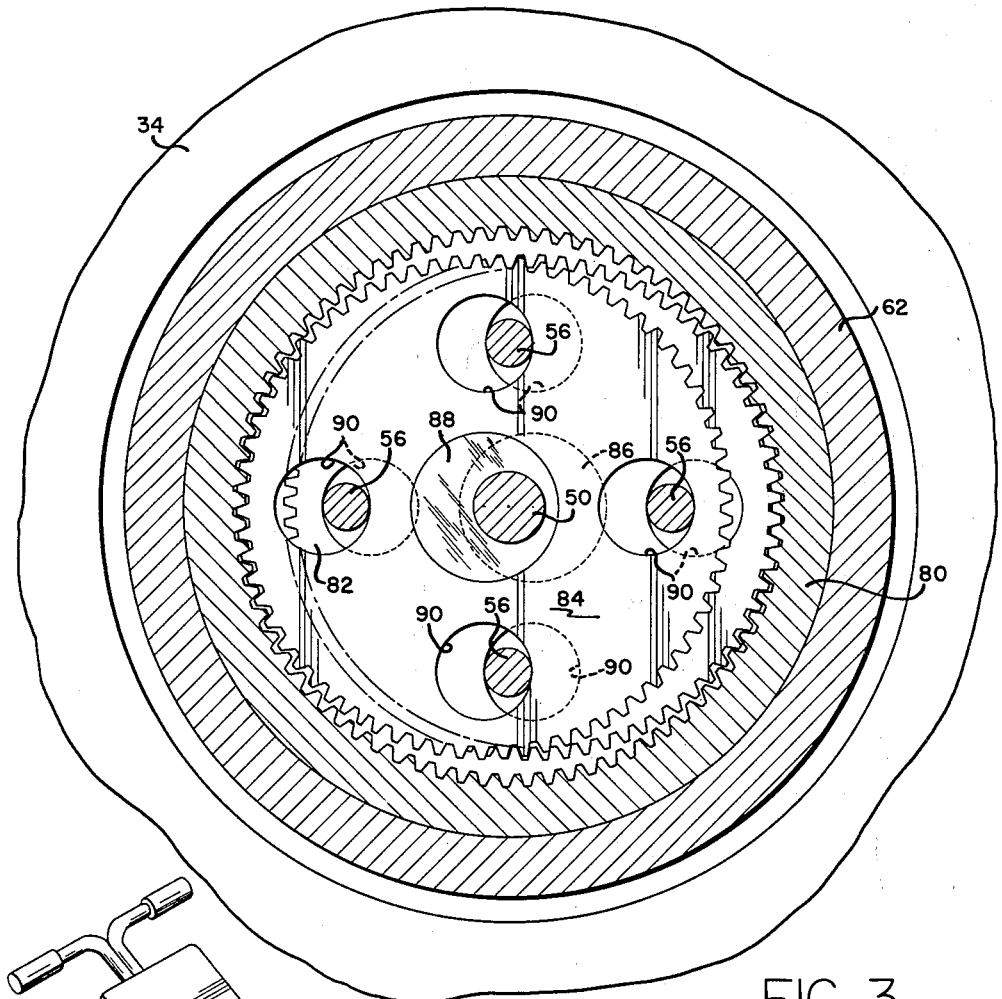
FIGURE 3 is a transverse sectional view indicated by line 3—3 on FIGURE 2 showing the construction and arrangement of the gearing somewhat more in detail.

Clamped between housing parts 62 and 70 is a ring gear 80 which meshes with gears 82 and 84 located inside the gear 80. The gears 82 and 84 have circular central bores therein, and gear 82 receives in its central bore an eccentric 86 on shaft 50 and gear 84 receives in its central bore an eccentric 88, fixed on shaft 50. These two eccentrics are positioned 180° away from each other, so that, as the gearing arrangement is observed in FIGURE 2, gear 82 is meshing with gear 86 at the extreme right while gear 84 is meshing with 80 at the extreme left. This will also be observed in FIGURE 3 where the two gears and the manner in which they mesh with gear 80 is also illustrated.

Each of gears 82 and 84 also have a series of circular bores 90 therein through which the studs 56 extend. Each bore 90 has a diameter which exceeds the diameter of the pertaining stud by the amount of lateral movement that the respective gear has inside ring gear 80.

As the eccentrics rotate the studs thus serve to guide the gears 82 and 84, and to restrain these gears against rotation so that the movement of these gears is purely bodily and in translation, thereby driving gear 80 in rotation at a speed greatly reduced from the speed of rotation of shaft 50 on which the said eccentrics are fixed.

It will be observed that the gears 82 and 84 always engage ring gear 80 at diametrically opposite points, and in this manner, lateral thrust on the ring gear is eliminated, and this of course, greatly reduces the loading imposed on the bearings 60 and 76 which rotatably support the housing within which ring gear 80 is clamped.

As to the driving of shaft 50 in rotation, this is accomplished by the use of a disc element 92 having a key portion 94 extending into a transverse slot in the lower end of shaft 26 and another key portion 96 that extends into a transverse slot in the upper end of shaft 50.

Inasmuch as the housing is driven in rotation, it can be employed for supporting the brush 10 by forming the brush and the housing with cooperating elements of a bayonet type latch, for example, so that the brush can be connected with the housing, but be in driving engagement therewith when mounted on the housing. The housing arrangement provides for accurate location of the brush by providing the housing with the locating surface 98 engaging the back of the brush body while the cylindrical surface 100 on the housing engages a corresponding surface on the brush body. This locates the brush body radially and axially on the housing. The plate 64, of course, retains the brush in place and this plate is provided with driving lugs, say three in number, as indicated at 102 for effecting positive driving engagement with the brush body.

The gears 82 and 84 may advantageously be formed of a fibrous material, for example, reinforced Bakelite, thus having quiet-running characteristics and long life.

The drive arrangement illustrated requires, of course, exact machining of the eccentrics 86 and 88 and of the studs 56 and bores 90 and requires that the frame members 44 and 54 accurately support the studs within the frame, but this can readily be accomplished by conventional machining practices and represents no difficulty in the manufacturing process.

The structure includes wear plates 87 between the block 44 and gear 82; between gears 82 and 84; and between gear 84 and frame member 54.

It will be understood that this invention is susceptible to modifications in order to adapt it to different usages and conditions; and accordingly, it is desired to comprehend such modifications within this invention as may fall within the scope of the appended claims.

I claim:

1. In a geared speed reducing drive; a non-rotatable frame member, a housing supported on said frame member for rotation on the central axis of the housing, an internal gear in said housing concentric with said axis, external gears inside said internal gear eccentrically located relative to said axis and meshing with said internal gear, each external gear having a central bore and circumferentially spaced holes located radially outwardly from the said central bore therein, frame elements in said housing on opposite sides of said external gears, studs interconnecting said frame elements and extending through the said holes in said external gears, a shaft journaled in said frame elements and extending through the said central bores in said external gears, eccentrics on said shaft fitting said central bores of the said external gears, and means fixedly connecting said frame elements to said frame member to hold the frame elements and the said studs and therefore said external gears against rotation relative to said frame member.

2. In a geared speed reducing drive; a non-rotatable frame member, a housing supported on said frame member for rotation on the central axis of the housing, an internal gear in said housing concentric with said axis, external gears inside said internal gear eccentrically located relative to said axis and meshing with said internal gear, each external gear having a central bore and circumferentially spaced holes located radially outwardly from the said central bore therein, frame elements in said housing on opposite sides of said external gears, studs interconnecting said frame elements through the said holes in said external gears, a shaft journaled in said frame elements and extending through the said central bores in said external gears, eccentrics on said shaft fitting said central bores of the said external gears, and means fixedly connecting said frame elements to said frame member to hold the frame elements and the said studs and therefore said external gears against rotation relative to said frame member, said frame member being adapted for supporting a drive motor, and said frame member being formed with an opening for receiving the output shaft of said drive motor for connection thereof to the said shaft carrying the said eccentrics.

3. In a geared speed reducing drive; a non-rotatable frame member, a housing supported on said frame member for rotation on the central axis of the housing, an internal gear in said housing concentric with said axis, external gears inside said internal gear eccentrically located relative to said axis and meshing with said internal gear, each external gear having a central bore and circumferentially spaced holes located radially outwardly from the said central bore therein, frame elements in said housing on opposite sides of said external gears, studs interconnecting said frame elements and extending through the said holes in said external gears, a shaft journaled in said frame elements and extending through the said central bores in said external gears, eccentrics on said shaft fitting said central bores of the said external gears, and means fixedly connecting said frame elements to said frame member to hold the frame elements and the said studs and therefore said external gears against rotation relative to said frame member, means for supporting a drive motor on said frame member, means for connecting the output shaft of said drive motor with the said shaft that carries said eccentrics, and means on the exposed end of said housing for connecting a tool thereto for being driven in rotation by said housing.

4. In a geared speed reducing drive; a non-rotatable frame member, a housing supported on said frame member for rotation on the central axis of the housing, an internal gear in said housing concentric with said axis, external gears inside said internal gear eccentrically located relative to said axis and meshing with said internal gear, each external gear having a central bore and circumferentially spaced holes located radially outwardly from the said central bore therein, frame elements in said housing on opposite sides of said external gears, studs interconnecting said frame elements and extending through the said holes in said external gears, a shaft journaled in said frame elements and extending through the said central bores in said external gears, eccentric on said shaft fitting said central bores of the said external gears, and means fixedly connecting said frame elements to said frame member to hold the frame elements and the said studs and therefore said external gears against rotation relative to said frame member, said external gears being spaced from each other and from said frame elements, and wear plate means interposed between said frame elements and the adjacent external gears and between the said external gears.

5. In a geared speed reducing drive; a non-rotatable frame member, a housing supported on said frame member for rotation on the central axis of the housing, an internal gear in said housing concentric with said axis, external gears inside said internal gear eccentrically located relative to said axis and meshing with said internal gear, each external gear having a central bore and circumferentially spaced holes located radially outwardly from the said central bore therein, frame elements in said housing on opposite sides of said external gears, studs interconnecting said frame elements and extending through the said frame elements and extending through the said central bores in said external gears, eccentrics on said shaft fitting said central bores of the said external gears, and means fixedly connecting said frame elements to said frame member to hold the frame elements and the said studs and therefore said external gears against rotation relative to said frame member, said housing comprising parts separable in a plane transverse to the axis of rotation of the housing, and said external gear being clamped in the housing between the said parts thereof.

6. In a geared speed reducing drive; a non-rotatable frame member, a housing supported on said frame member for rotation on the central axis of the housing, an internal gear in said housing concentric with said axis, external gears inside said internal gear eccentrically located relative to said axis and meshing with said internal gear, each external gear having a central bore and circumferentially spaced holes located radially outwardly from the said central bore therein, frame elements in said housing on opposite sides of said external gears, studs interconnecting said frame elements and extending through the said holes in said external gears, a shaft journaled in said frame elements and extending through the said central bores in said external gears, eccentrics on said shaft fitting said central bores of the said external gears, and means fixedly connecting said frame elements to said frame member to hold the frame elements and the said studs and therefore said external gears against rotation relative to said frame member, said studs being shouldered at opposite ends and having reduced diameter parts engaging said frame elements thereby to hold said frame elements in fixedly spaced relation, the throw of each said eccentric, and the difference in diameter between each stud and the holes in the external gears through which the studs extend being equal to the difference in pitch diameters of the internal gear and the external gears.

7. In a geared speed reducing drive; a non-rotatable frame member, a housing supported on said frame member for rotation on the central axis of the housing, an internal gear in said housing concentric with said axis, external gears inside said internal gear eccentrically located relative to said axis and meshing with said internal gear, each external gear having a central bore and circumferentially spaced holes located radially outwardly from the said central bore therein, frame elements in said housing on opposite sides of said external gears, studs interconnecting said frame elements and extending through the said holes in said external gears, a shaft journaled in said frame elements and extending through the said central bores in said external gears, eccentrics on said shaft fitting said central bores of the said external gears, and means fixedly connecting said frame elements to said frame member to hold the frame elements and the said studs and therefore said external gears against rotation relative to said frame member, an anti-friction bearing between the housing and the frame member at one end of the housing, another anti-friction bearing between the other end of the housing and the adjacent one of said frame elements, and sealing means positioned between the housing and the said frame member.

8. In a geared speed reducing drive; a non-rotatable frame member, a housing supported on said frame member for rotation on the central axis of the housing, an internal gear in said housing concentric with said axis, external gears inside said internal gear eccentrically located relative to said axis and meshing with said internal gear, each external gear having a central bore and circumferentially spaced holes located radially outwardly from the said central bore therein, frame elements in said housing on opposite sides of said external gears, studs interconnecting said frame elements and extending through the said holes in said external gears, a shaft journaled in said frame elements and extending through the said central bores in said external gears, eccentrics on said shaft fitting said central bores of the said external gears, and means fixedly connecting said frame elements to said frame member to hold the frame elements and said studs and therefore said external gears against rotation relative to said frame member, said fame member being adapted for receiving and supporting the stator of an electric drive motor, said frame member being formed with a central opening in alignment with the said shaft journaled on the frame elements, an anti-friction bearing in said frame member, said anti-friction bearing being adapted for receiving the shaft of an electric motor rotor, and key means arranged for drivingly interconnecting the said rotor shaft with the said shaft that is journaled in said frame elements.

References Cited in the file of this patent
UNITED STATES PATENTS

| | | |
|---|---|---|
| 1,673,838 | Mackenzie | June 19, 1928 |
| 1,770,035 | Heap et al. | July 8, 1930 |
| 3,087,078 | Brown | Apr. 23, 1963 |